(12) United States Patent
Malicki

(10) Patent No.: US 8,757,539 B2
(45) Date of Patent: Jun. 24, 2014

(54) SYSTEM FOR TRANSPORTING AN AIRPLANE FROM A PARKING LOCATION TO A TAKEOFF LOCATION AND FROM A LANDING LOCATION TO A PARKING LOCATION

(76) Inventor: Slavomir Malicki, Magdalenka (PL)

( * ) Notice: Subject to any disclaimer, the term of this patent is extended or adjusted under 35 U.S.C. 154(b) by 0 days.

(21) Appl. No.: 13/575,322

(22) PCT Filed: Jan. 26, 2011

(86) PCT No.: PCT/PL2011/000009
§ 371 (c)(1),
(2), (4) Date: Jul. 26, 2012

(87) PCT Pub. No.: WO2011/096833
PCT Pub. Date: Aug. 11, 2011

(65) Prior Publication Data
US 2012/0298797 A1   Nov. 29, 2012

(30) Foreign Application Priority Data

Feb. 5, 2010   (PL) .......................................... 390365

(51) Int. Cl.
*B64F 1/00*   (2006.01)
*B64F 1/04*   (2006.01)
*B64F 1/22*   (2006.01)

(52) U.S. Cl.
USPC ........................................ 244/50; 244/114 R

(58) Field of Classification Search
USPC .............. 244/50, 51, 114 R, 115, 116, 110 E; 104/194, 145, 140
See application file for complete search history.

(56) References Cited

U.S. PATENT DOCUMENTS

| | | | | |
|---|---|---|---|---|
| 554,445 | A * | 2/1896 | Holden | 104/194 |
| 3,162,404 | A * | 12/1964 | Squire | 244/114 R |
| 4,252,285 | A * | 2/1981 | Hammond et al. | 244/114 R |
| 5,161,753 | A * | 11/1992 | Vice et al. | 244/116 |
| 6,131,854 | A * | 10/2000 | Nicolai | 244/114 R |

FOREIGN PATENT DOCUMENTS

| DE | 19902803 A1 | 8/2000 |
|---|---|---|
| JP | 4317852 A | 11/1992 |
| WO | 8908051 A1 | 9/1989 |
| WO | 03078250 A1 | 9/2003 |

OTHER PUBLICATIONS

Machine translation of WO 03/078250 A1 to Mallet from Espacenet.com.*

* cited by examiner

*Primary Examiner* — Tien Dinh
*Assistant Examiner* — Richard R Green
(74) *Attorney, Agent, or Firm* — Christopher L. Parmelee; Walker & Jocke

(57) ABSTRACT

The invention solves the question of a system for transporting airplanes about airport apron from the parking location to the takeoff runway and from the landing location to the parking location with engines switched off. The system is made up of guiding grooves (5) in which guiding pins (9) installed in docking stations (8) move and are catch-fitted preferably to the front wheel (10) of the airplane (4). The guiding grooves (5) are covered from above by pivotable gratings (11) of a segmental design that open giving way to guiding pin (9) sliding in the guiding groove (5) and close following the passage of the guiding pin (9). Switching devices (12) are installed at locations of abrupt curves in the guiding grooves (4) as well as at locations of changes in direction.

5 Claims, 2 Drawing Sheets

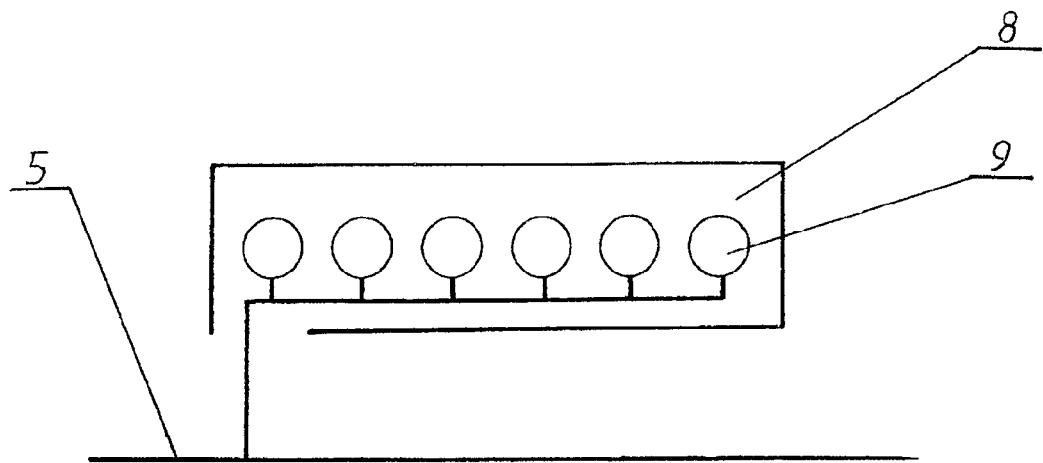
Fig.2
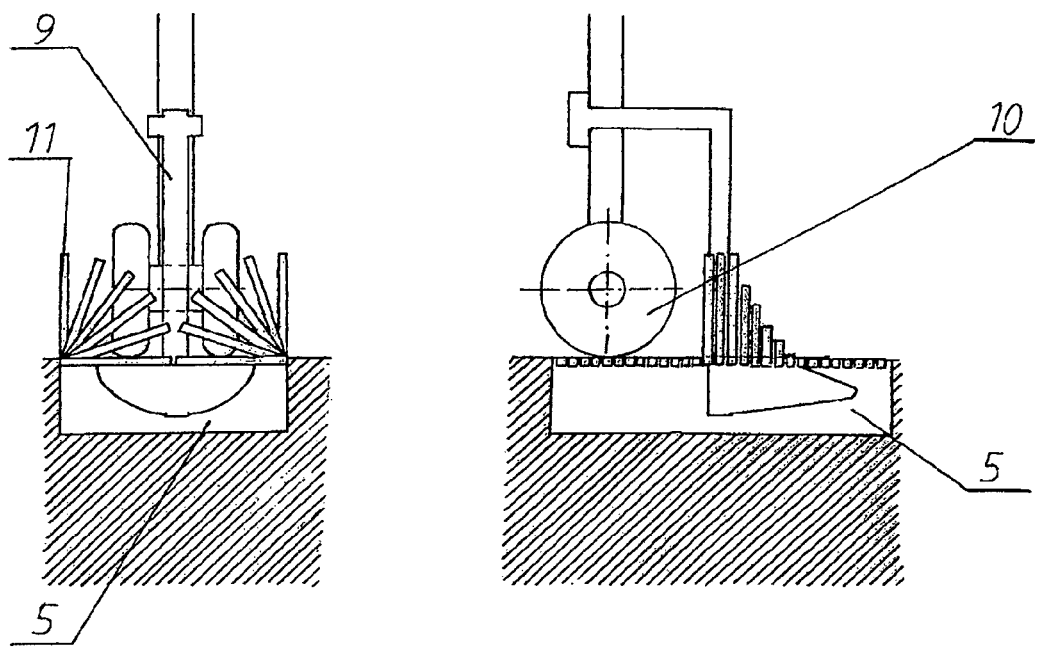
Fig. 3  Fig.4

SYSTEM FOR TRANSPORTING AN AIRPLANE FROM A PARKING LOCATION TO A TAKEOFF LOCATION AND FROM A LANDING LOCATION TO A PARKING LOCATION

It is the object of this invention to provide a system for transporting airplanes from their parking area to the takeoff area and from the landing area to the parking area. This solution is applicable in the field of aviation.

To date, airplanes have been moved on the airport apron, from the parking location to the takeoff runway, or following landing to the parking location, under their own power, with the engines on.

It is the object of this solution according to the invention to provide a possibility to transport an airplane from its parking area to the takeoff runway, or to displace it following landing and transporting it to the parking area, with the engine off. It is the object of the solution to develop a structure of a system that will facilitate implementation of this concept. Implementation of this concept will result in decrease in the fuel consumption, decrease in the amount of combustion gases, as well as in reduction of noise in the airport surroundings. It is also envisaged to allow diminishing of the amount of fuel carried by an airplane. Thanks to this solution the airplane will be lighter and more economical in operation.

The subject-matter of the invention is a system for transporting airplanes on an airport apron, from a parking location to a takeoff location, and from a landing location to a parking location, with the engines off. The system according to the solution is comprised of docking stations formed in service roads to the airport runway, said docking stations being connected to guiding grooves positioned along the transportation route of the airplane to the parking location. In the docking station, guiding pins are mounted, preferably attached to the front wheel of the airplane after the plane is brought up to the docking station. Terminal transportation routes branch off from the main transportation route. The guiding grooves defining these routes are covered from above by pivotable gratings of a segmental design. The pivotable gratings open automatically giving way to the guiding pin sliding in the guiding groove. After passage of the guiding pin, the pivotable gratings close. Switching devices are installed at locations of changes in direction, abrupt curves of the guiding grooves and junctions of the main transportation route with terminal transportation routes. The movement of the guiding pin is automatically controlled by the airport ground staff in collaboration of the pilot of the airplane. In the guiding groove a bus bar is installed, from which by means of a collector the electrical installation of the airplane transportation system is powered.

The solution according to the invention enables reduction of enormous quantities of fuel consumed in transporting an airplane on the airport apron from the parking location to the takeoff runway and in the opposite direction. The solution makes is possible to reduce the amount of fuel carried during the flight. Combustion of smaller amounts of fuel causes reduction of the quantities of combustion gases emitted into the atmosphere. A very important effect of implementation of the solution is noise reduction in the airport's surroundings, alleviation of the nuisance caused by the vicinity of an airport to the inhabitants of the nearby areas. This invention facilitates faster and precise organization of airplane taxiing, and this translates into a higher throughput of the airport. This also has a significant impact on the traffic safety in the airports. The strictly defined routes for transporting airplanes by means of guiding pins assigned to the individual airplanes eliminate the hazard of collision. The simple design of the solution enables performing installation thereof during regular airport operation. The solution improves efficiency of the personnel's work and makes it possible to reduce the number of members of the staff, thus decreasing the airport operating costs.

The object of the invention is explained in an embodiment shown in the attached drawing where:

FIG. 2 shows a view from above of a docking station;

FIG. 3 shows a cross-sectional front view of a guiding pin fixed to a front wheel of an airplane; and FIG. 4 shows it in a side cross-sectional view.

Figure 1:
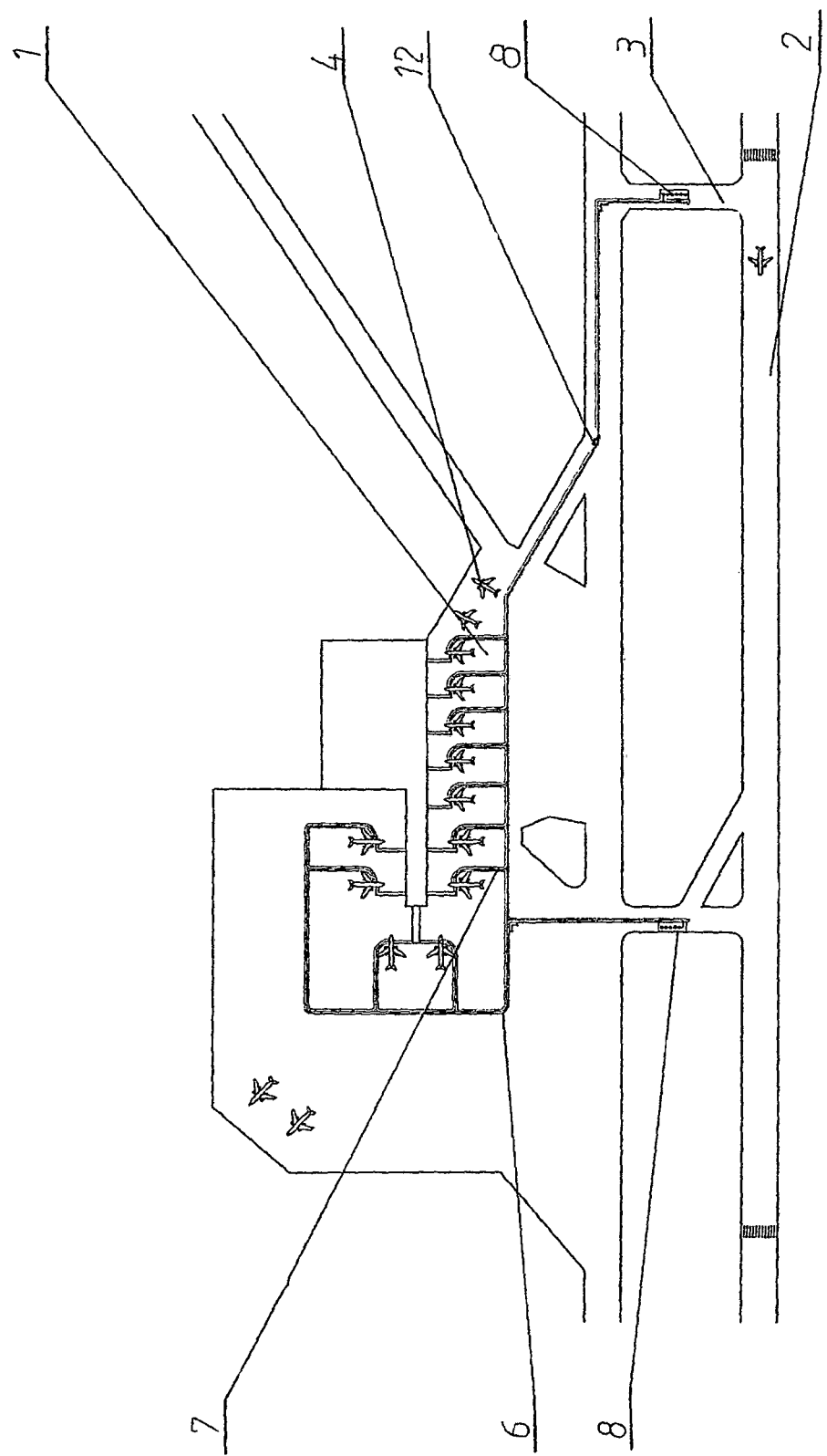
FIG. 1 shows a airport apron with guiding grooves distributed on the surface thereof.

The system for transporting airplanes on the airport apron, from a parking location 1 to a takeoff runway 2, and from a landing location to a parking location, with the engines turned off, is constituted by guiding grooves 5 formed in the surface of service roads 3 to a takeoff runway 2, said grooves defining the transportation route of an airplane 4 on the airport apron. The guiding grooves 5 define the main transportation route 6 and terminal transportation routes 7. The guiding grooves 5 are connected to docking stations 8, located in the service roads 3. At the docking stations 8, guiding pins 9 are mounted, said pins being catch-fitted to a front wheel 10 of a plane 4. The guiding pins 9 move in the guiding grooves 5, and the motion thereof is automatically controlled by the airport ground staff in collaboration with the pilot of the airplane 4. The guiding grooves 5 are covered from above by pivotable gratings 11 of a segmental design. The pivotable gratings 11 open automatically giving way to the guiding pin 9 sliding in the guiding groove 5. After passage of the guiding pin 9 the pivotable gratings 11 close. At the locations of abrupt curves of the guiding grooves 4 or at the locations of changes in direction thereof, switching devices 12 are installed. In the guiding groove 5 a bus bar is installed, from which by means of a collector the electrical installation of the airplane transportation system is powered.

The invention claimed is:

1. A system for transporting airplanes on the airport apron, from a parking location to a takeoff runway and from a landing location to a parking location, comprised of guiding grooves in which guiding pins slide, said pins being installed in docking stations and catch-fitted to a wheel of an airplane, where the guiding grooves are covered from above by pivotable gratings of a segmental structure that are open giving way to a guiding pin sliding in a guiding groove, and after passage of the guiding pin they are closed, and moreover at the locations of abrupt curves of the guiding grooves or at the locations of changes in directions thereof, switching devices are installed.

2. The system according to claim 1, wherein the guiding grooves define the main transportation route and the terminal transportation routes.

3. The system according to claim 1, wherein the movement of the guiding pins is automatically controlled by the ground staff of the airport in collaboration with the pilot of the airplane.

4. The system according to claim 1, wherein in the guiding groove a bus bar is installed, from which by means of a collector the electrical installation of the airplane transportation system is powered.

5. The system according to claim 1, wherein the guiding pins are adapted to catch the airplane adjacent a front wheel of the airplane, wherein the pivotable gratings have width dimensions parallel to a pivotal axis of the pivotable gratings and have length dimensions that extend radially from the pivotal axis, wherein the width dimensions are narrower than the length dimensions of the pivotable gratings.

* * * * *